May 19, 1936.   S. A. COGSDILL   2,040,978
DEVICE FOR LOADING TOOLS IN HOLDERS
Filed Aug. 5, 1935
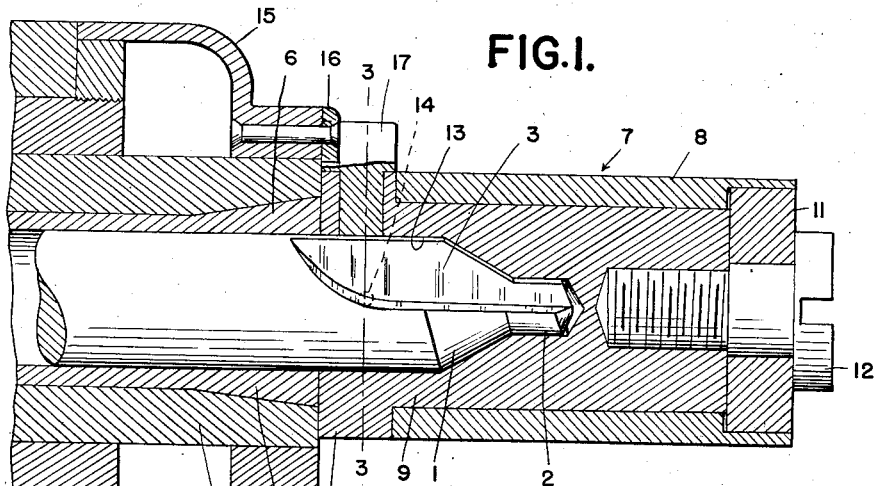
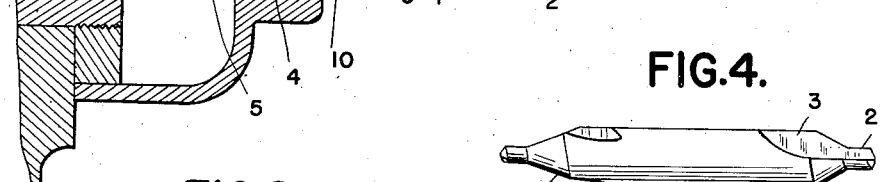
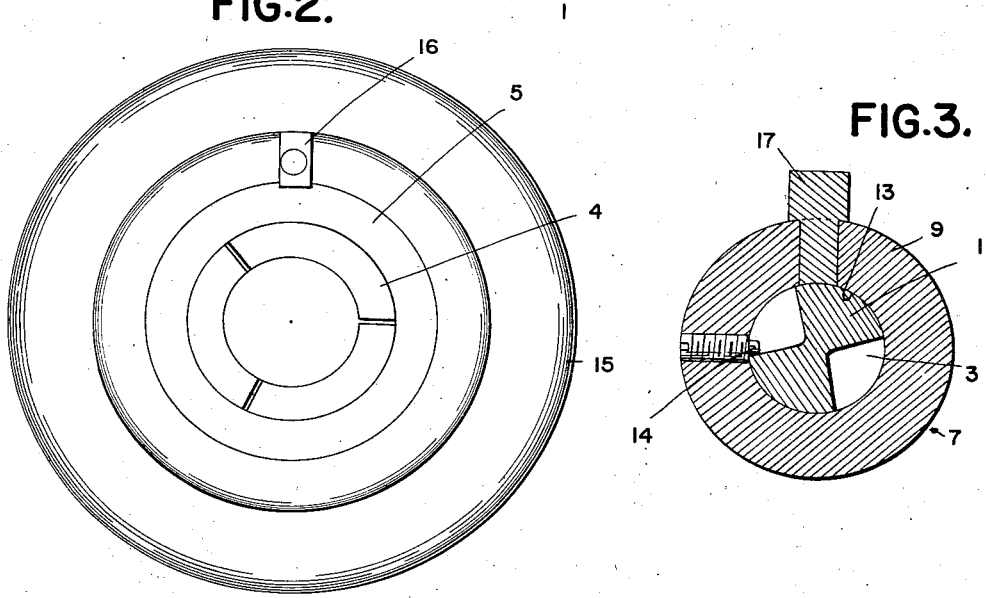
INVENTOR
STUART A. COGSDILL
BY
ATTORNEYS Patented May 19, 1936

2,040,978

UNITED STATES PATENT OFFICE 2,040,978

DEVICE FOR LOADING TOOLS IN HOLDERS

Stuart A. Cogsdill, Detroit, Mich., assignor to Cogsdill Manufacturing Company, Inc., Detroit, Mich., a corporation of Michigan Application August 5, 1935, Serial No. 34,819

4 Claims. (Cl. 51—277)

The invention relates to devices for loading tools in holders and refers more particularly to devices for loading fluted cutting tools in holders.

The invention has for one of its objects to provide a device for loading a tool in a holder while the holder is rotating. The invention has for another object to provide a loading device which will predeterminedly angularly position the tool relative to the holder. The invention has for a further object to provide a device which is simple in construction and can be easily handled.

These and other objects of the invention will become apparent from the following description, taken in connection with the accompanying drawing, in which Figure 1 is a sectional view showing a device embodying my invention;

Figure 2 is an end view of the holder;

Figure 3 is a cross section on the line 3—3 of Figure 1;

Figure 4 is an elevation of one of the tools.

The device illustrated in the present instance is designed particularly for loading combined drills and countersinks in a holder, although it is apparent that in its broader aspects it may be used for loading other tools in holders.

As shown in Figure 4, the tool has the drill part 1 and the countersink part 2 and the flutes 3 extending through both the drill and countersink parts. 4 is the holder or chuck for receiving the tool. This holder is rotatable and, as shown, is mounted within and keyed to the spindle 5, which may be positively rotated by suitable means. The holder is formed with the flared end portion 6 and the portion of the spindle for engaging this flared end portion is also internally flared so that as the holder is drawn axially into the spindle its flared end portion will be contracted to grip the tool. It is apparent that movement of the holder in the opposite direction permits the flared end portion to expand and thereby release the tool.

In the present instance the drill and countersink parts of the tool are adapted to be ground by a suitable abrasive member or grinding wheel and these parts are adapted to be provided with radial relief. It is therefore essential that the tool be predeterminedly angularly positioned in the holder.

7 is the loading device for the tool. This device comprises the cylindrical support 8 and the tool carrying member 9 which is journaled in the support and held from axial movement relative thereto by the annular flange 10 upon one end of the tool carrying member and the washer 11 fixedly secured to the other end of the tool carrying member by suitable means such as the screw 12. The annular flange and the washer abut the opposite ends of the support. The tool carrying member is provided with the axial recess 13 which is shaped to fit the drill and countersink parts 1 and 2 of the tool and which thereby predeterminedly positions the tool longitudinally of the tool carrying member. 14 is a suitable projection extending into the recess and adapted to engage one of the substantially radially extending shoulders formed by one of the flutes 3 in the tool to predeterminedly angularly position the tool relative to the tool carrying member.

The spindle 5 has fixedly mounted thereon the collar 15 to which is fixedly secured the finger 16. This finger is radially beyond the holder and preferably extends axially beyond the end of the spindle. The tool carrying member 9 has fixedly secured thereto the finger 17 which extends radially therebeyond. The fingers 16 and 17 provide shoulders which, when the loading device is manually moved to a position to place the tool in operative relation to the holder, are engageable with each other to thereby accurately predeterminedly angularly locate the tool in the holder so that when this holder is moved axially inwardly relative to the spindle it will be gripped in the desired position. The operative relation is determined by holding the tool carrying member against the end of the holder. Since the tool is predeterminedly longitudinally positioned in the tool carrying member, the tool will also be predeterminedly longitudinally positioned in the holder. By reason of the tool carrying member being rotatably carried by the support, the former may rotate with the holder and the support may be readily held by hand until the tool has been gripped.

What I claim as my invention is:

1. The combination with a rotatable holder adapted to grip a tool, of a loading device comprising a support, and a tool carrying member rotatable on said support, said device being movable to a position to place the tool in operative relation to said holder, and co-operating means rotatable with said holder and carrying member for predeterminedly positioning the tool relative to said holder.

2. The combination with a rotatable holder adapted to grip a tool and means forming a shoulder rotatable with said holder, of a loading device comprising a support, a tool carrying member rotatable on said support, and means forming a shoulder rotatable with said carrying member, said loading device being movable to a position to place the tool in operative relation to said holder and said shoulder forming means being engageable to predeterminedly position the tool relative to said holder.

3. The combination with a rotatable holder adapted to grip a tool and a finger radially beyond and rotatable with said holder, of a loading device comprising a support adapted to be held manually, a member journaled in said support for detachably carrying a tool in a predetermined angular relation thereto, and a finger radially beyond and rotatable with said tool carrying member, said loading device being movable to a position to place the tool in operative relation to said holder and said fingers being engageable to predeterminedly angularly position the tool relative to said holder.

4. The combination with a rotatable holder adapted to grip a cutting tool, a spindle rotatable with said holder, and a finger mounted upon and rotatable with said spindle, of a loading device comprising a support adapted to be held manually, a member journaled in said support for detachably carrying a cutting tool, means upon said last mentioned member for positioning the tool in a predetermined angular relation thereto, and a finger radially beyond and rotatable with said last mentioned member, said loading device being movable to a position to place the tool in operative relation to said holder and said fingers being engageable to predeterminedly angularly position the tool relative to said holder.

STUART A. COGSDILL.